United States Patent [19]

Slonim

[11] Patent Number: 5,244,359

[45] Date of Patent: Sep. 14, 1993

[54] WAVE ENERGY CONVERTER

[76] Inventor: David M. Slonim, P.O. Box 1869, 3, Ourania Str., Nicosia, Cyprus

[21] Appl. No.: 970,077

[22] Filed: Oct. 15, 1992

[51] Int. Cl.$^5$ ............................................. F03B 13/12
[52] U.S. Cl. .................................................... 417/332
[58] Field of Search ........................ 417/332, 330, 331; 290/53

[56] References Cited

U.S. PATENT DOCUMENTS

| | | |
|---|---|---|
| 578,612 | 3/1897 | Spangler ............................ 417/332 |
| 739,538 | 9/1903 | Fredson . |
| 3,965,365 | 6/1976 | Parr . |
| 3,970,415 | 7/1976 | Widecrantz et al. . |
| 4,111,610 | 9/1978 | Brown . |
| 4,281,257 | 7/1981 | Testa et al. . |
| 4,379,235 | 4/1983 | Trepl, II . |
| 4,560,884 | 12/1985 | Whittecar . |
| 4,808,455 | 2/1989 | Wada et al. . |
| 4,931,662 | 6/1990 | Burton . |

FOREIGN PATENT DOCUMENTS 618056 3/1927 France .................. 417/332

*Primary Examiner*—Richard E. Gluck
*Attorney, Agent, or Firm*—Young & Thompson

[57] ABSTRACT

A wave energy converter comprising an upright standard anchored to the bottom of a body of water. A vertical sleeve is supported for rotation on and relative to the standard about a common vertical axis. The sleeve contains at its upper end a double-acting pneumatic pumping chamber containing a vertically slidable piston and a piston rod that extends sealingly through a lower end of the pumping chamber. A generally horizontally extending arm is pivotally connected to the lower end of the piston rod and pivotally supported on the sleeve intermediate the length of the arm about a pivot fixed relative to the sleeve. A float is connected to the end of the arm remote from the sleeve. Conduits receive air expelled alternately through opposite ends of the pumping chamber and convey the air away from the converter. A swivel joint is disposed in one of the conduits for permitting rotation of an upstream portion of the conduit relative to a fixed downstream portion of the conduit.

4 Claims, 1 Drawing Sheet

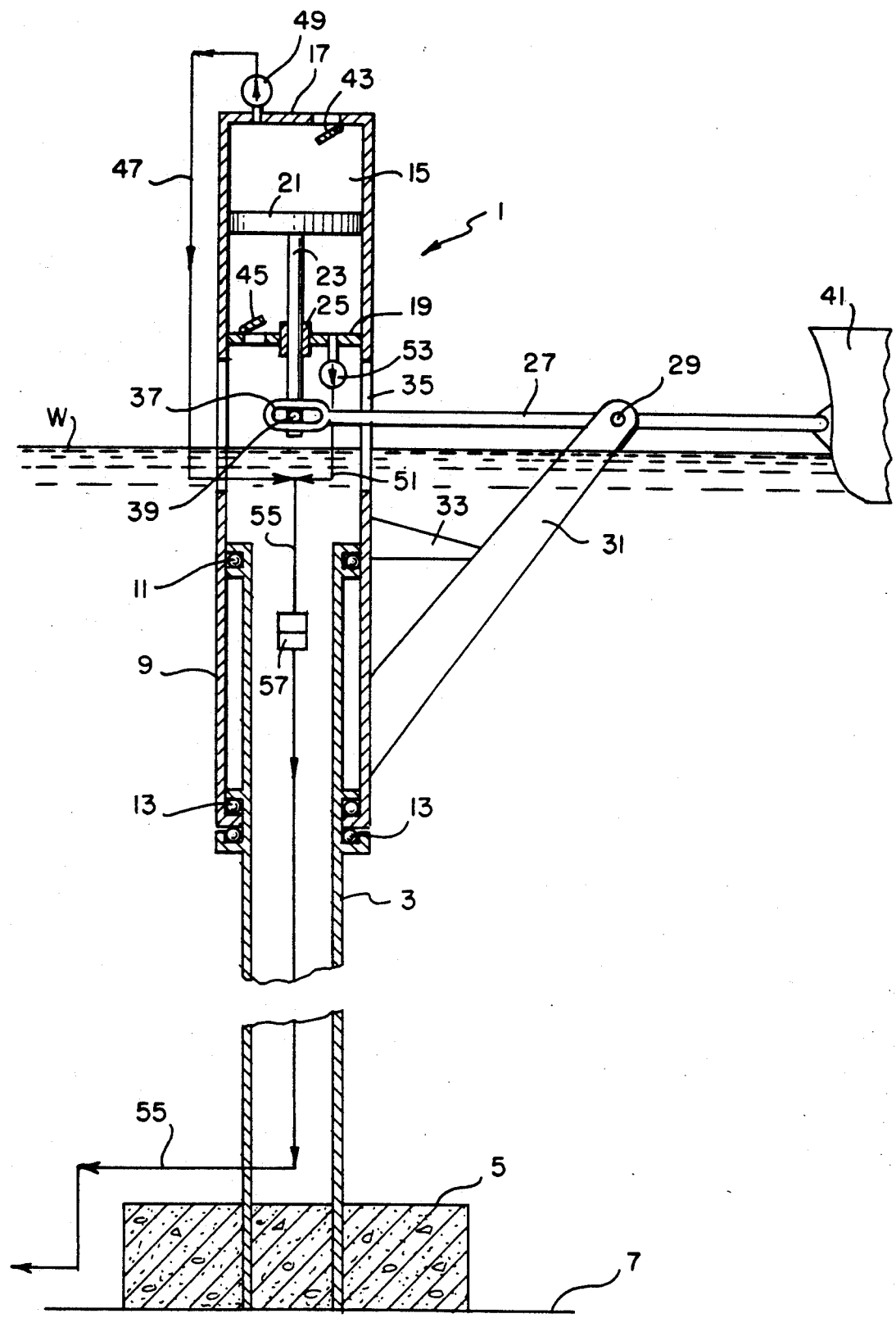

WAVE ENERGY CONVERTER

FIELD OF THE INVENTION

The present invention relates to wave energy converters, by which the energy of the rising and falling surface of a body of water is converted to pressure imposed on a confined fluid, preferably air.

THE KNOWN PRIOR ART

It is known to provide wave energy converters in which a buoyant body floating on the surface of a body of water, rises and falls with the surface of the body of water to operate a first-class lever by which a double-acting pneumatic cylinder and piston assembly is operated to compress air both on the upstroke and on the downstroke of the piston in the cylinder. Such a device is shown in WHITTECAR U.S. Pat. No. 4,560,884.

Such devices, however, are useful only in relatively shallow water and with relatively small floats. In deeper water, or in the case of a storm or if it is desired to provide a relatively large float such as a ship, then such devices are subject to severe damage from wind and wave action.

It is known to utilize the principle of swiveling, in order that a wave energy converter will act in optimum concert with the wave action that powers it. Such a device is shown in TREPL U.S. Pat. No. 4,379,235. Again, however, the amount of swiveling thus provided is not enough to protect the device against the severe conditions enumerated above.

OBJECTS OF THE INVENTION

It is accordingly an object of the present invention to provide a wave energy converter which can be used in relatively deep water.

Another object of the present invention is the provision of a wave energy converter which will not be damaged by severe storms.

Still another object of the present invention is the provision of a wave energy converter which can be powered by a float of very large size, such as a ship.

Finally, it is an object of the present invention to provide a wave energy converter, which will be relatively simple and inexpensive to construct, reliable and efficient in operation, and rugged and durable in use.

SUMMARY OF THE INVENTION

These and other objects of the present invention are achieved, by providing a wave energy converter in accordance with the present invention, which is anchored to the sea floor and is upstanding therefrom and rises above the surface of the water. A double-acting piston chamber in which reciprocates a piston, at the top of the device, is contained in a sleeve that rotates on a vertical axis about a standard extending to the sea floor. The sleeve carries an outboard pivot for an arm one end of which is connected to a float such as a boat and the other end of which operates the piston. One-way valves permit entry of air alternately into opposite ends of the cylinder but prevent exit of the air from either end of the cylinder except through further oppositely acting one-way valves which are disposed in conduits that join to a common outlet conduit which contains a swivel for accommodating swiveling movement of the sleeve. The float, no matter how large it is, will thus always be positioned downwind thanks to the swiveling of the sleeve about the standard.

BRIEF DESCRIPTION OF THE DRAWING

These and other objects, features and advantages of the present invention will become apparent from a consideration of the following description, taken in connection with the accompanying drawing, wherein the single FIGURE is an elevational view in cross section of a wave energy converter according to the present invention.

DETAILED DESCRIPTION OF THE INVENTION

Referring now to the drawing in greater detail, there is shown a wave energy converter 1 according to the present invention, comprising a hollow cylinder metal standard 3 which is secured at its lower end to a heavy anchor 5 that rests on the sea floor 7. A hollow cylindrical sleeve 9 has its lower end overlapping the upper end of standard 3 coaxially therewith. Radial bearings 11 at the upper end of standard 3 guide the rotation of sleeve 9 relative to standard 3; and thrust and radial bearings 13 at the lower end of sleeve 9 further guide the rotation of sleeve 9 relative to standard 3 and also provide axial thrust that supports sleeve 9 on standard 3 at the lower end of sleeve 9. Thrust and radial bearings 13 are double acting in the sense that they also prevent rising of sleeve 9 relative to standard 3.

Enclosed within the upper end of sleeve 9 is a pumping chamber 15 defined between a closed upper wall 17 and a closed lower wall 19. A piston 21 sealingly reciprocates vertically in pumping chamber 15, in slidable sealing relation with the side walls of that portion of sleeve 9, under the impetus of a vertical piston rod 23 which extends through lower wall 19 in slidably sealed relationship thanks to packing 25.

A generally horizontal arm 27 is pivoted outboard of and on sleeve 9 in the manner of a first class lever, for vertical swinging movement on and about a pivot 29 borne at the upper end of an arm 31 secured to the lower end of sleeve 9 and braced by a further arm 33 extending between sleeve 9 and arm 31.

A series of vertical slots 35 are disposed about and extend through sleeve 9 at the water line W to provide air for the underside of piston 21. Arm 27 extends radially inwardly through one of these slots 25 and terminates in an inner end traversed by an elongated slot 37 in which slides a pin 39 carried by the lower end of piston rod 23. Thus, slot 37 accommodates the fact that piston rod 23 slides only vertically and pivot 29 is fixed.

At the outer end of arm 27 is a float in the form of a boat 41. Alternatively, the float may be a chamber which is hollow or filled with foamed plastic.

It was stated above that pumping chamber 15 is closed at its upper and lower ends by walls 17 and 19, respectively; and this is normally true. But entry of air into pumping chamber 15 from above, to the upper side of piston 21, is provided past a normally closed flap valve 43; and similarly, the entry of air into the lower portion of pumping chamber 15, below piston 21, is permitted by the opening of a normally closed flap valve 45. It is to be noted that air cannot leave pumping chamber 15 past either flap valve 43 or flap valve 45.

Air can leave the top of pumping chamber 15 through conduit 47 by passing through a one-way valve 49; and air can leave the bottom of pumping chamber 15 through a conduit 51 by passing through a one-way valve 53. Conduits 47 and 51 join in a common outlet conduit 55 that has a swivel joint 57 therein. The lower part of conduit 55, below swivel joint 57, is fixed; and the upper part of conduit 55, above swivel joint 57, rotates with sleeve 9.

Air passing through conduit 55 leaves the converter and may be utilized wherever air under pressure is desired, for example for storage at high pressure to provide a source of high pressure air as desired, or to operate electrical generation equipment, desalinization equipment, etc. This utilization can take place either offshore or onshore.

In operation, the rising and falling of water level W under wave action, causes boat 41 to rise and fall, thereby causing piston 21 to fall and rise, respectively. When piston 21 rises, flap valve 43 closes and flap valve 45 opens, so that air is drawn into pumping chamber 15 below piston 21 and is expelled from pumping chamber 15 through conduit 47 past one-way valve 49, this air then proceeding to conduit 55 and its utilization. This air, however, cannot return via conduit 51 to pumping chamber 15 below piston 21, because one-way valve 53 prevents it.

Similarly, on the downstroke of piston 21, flap valve 43 opens and flap valve 45 closes, so that air can leave pumping chamber 15 only through conduit 51 past one-way valve 53 and thence to conduit 55. Air from conduit 55 cannot return via conduit 47 to the top of pumping chamber 15, because one-way valve 49 prevents it.

Under the influence of wind or even storms, boat 41 will automatically position itself downwind, the rotation of sleeve 9 about the common vertical axis of sleeve 9 and standard 3 permitting this adjustment of the position of the converter. Thus, substantial torsion cannot be exerted on standard 3 by wind or wave action. As a result, no matter how long standard 3 is, it will not tend to rack; and so the device of the present invention is useful in relatively deep water. For the same reason, the horizontal thrust on the converter, by the action of storms, will be kept to a minimum. This also permits the use of large floats such as ships.

The invention is susceptible to various modifications. Thus, it is not necessary to use a rigid standard 3 fixedly secured to anchor 5. Instead, it is possible to provide a universal joint at the lower end of standard 3, by which the lower end of standard 3 is secured to anchor 5. This allows standard 3 to incline in any direction away from the wind or storm, the buoyancy of boat 41 serving normally to urge standard 3 to the upright position shown in the drawing.

Moreover, it is not necessary that standard 3 be rigid over its entire length. It can be articulated or even in the form of a chain, provided a swivel joint is provided along its length to minimize twisting.

To accommodate the rising and falling of the tides, it is also possible to mount the sleeve 9 and the upper end of standard 3 on a float which is anchored to the sea floor, not by a directly downwardly extending portion, but rather by anchor chains which extend according to catenary curves in various directions away from the float. The float thus has the ability to rise and fall with the tide, the anchor chains having sufficient inertia to prevent the float from rising and falling also with wave action, so that the float will in that instance rise and fall with the waves relative to the float that supports the sleeve 9 and the upper end of standard 3.

The possibility of providing these and other modifications and variations of the present invention will be apparent to those of ordinary skill in the art. Such modifications and variations are considered to be within the purview and scope of the present invention as defined by the appended claims.

What is claimed is:

1. A wave energy converter comprising an upright standard, means anchoring the upright standard to the bottom of a body of water, a vertical sleeve supported for rotation on and relative to the standard about a common vertical axis, the sleeve containing at its upper end a double-acting pneumatic pumping chamber containing a vertically slidable piston and a piston rod that extends sealingly through a lower end of the pumping chamber, a generally horizontally extending arm pivotally connected to the lower end of the piston rod and pivotally supported on a projection intermediate the length of the arm about a pivot fixed relative to the sleeve, a float on the end of the arm remote from the sleeve, conduit means for receiving air expelled alternately through opposite ends of said pumping chamber and for conveying said air away from the converter, and swivel joint means disposed in said conduit means for permitting rotation of an upstream portion of said conduit means relative to a fixed downstream portion of said conduit means.

2. A wave energy converter as claimed in claim 1, said standard and sleeve being cylindrical and coaxial and overlying each other a substantial distance at the top of said standard and at the bottom of said sleeve, and thrust and radial bearings between said standard and said sleeve to permit rotation of said sleeve relative to said standard about said common vertical axis but to fix said standard and sleeve against axial sliding movement relative to each other.

3. A wave energy converter as claimed in claim 1, said sleeve being apertured to permit both the access of air to the underside of said pumping chamber and to permit said arm to engage said piston rod.

4. A wave energy converter as claimed in claim 1, there being a pin and slot connection between said piston rod and said arm to permit vertical swinging movement of said arm at the same time that said piston rod moves only vertically.

* * * * *